United States Patent
Hoyle

(10) Patent No.: US 9,453,608 B2
(45) Date of Patent: Sep. 27, 2016

(54) SELF-LEVELING UTILITY PLATFORM

(71) Applicant: Gary Hoyle, Cumming, GA (US)

(72) Inventor: Gary Hoyle, Cumming, GA (US)

(*) Notice: Subject to any disclaimer, the term of this patent is extended or adjusted under 35 U.S.C. 154(b) by 0 days.

(21) Appl. No.: 14/860,098

(22) Filed: Sep. 21, 2015

(65) Prior Publication Data

US 2016/0178114 A1    Jun. 23, 2016

Related U.S. Application Data

(63) Continuation-in-part of application No. 13/889,093, filed on May 7, 2013, now Pat. No. 9,140,401.

(51) Int. Cl.
| | | |
|---|---|---|
| *F16L 3/00* | (2006.01) | |
| *F16M 11/38* | (2006.01) | |
| *A47B 13/02* | (2006.01) | |
| *B25H 1/02* | (2006.01) | |

(52) U.S. Cl.
CPC .............. *F16M 11/38* (2013.01); *A47B 13/02* (2013.01); *B25H 1/02* (2013.01)

(58) Field of Classification Search
None
See application file for complete search history.

(56) References Cited

U.S. PATENT DOCUMENTS

| | | | | | |
|---|---|---|---|---|---|
| 2,794,688 | A | * | 6/1957 | Scott | B25H 1/06 182/155 |
| 3,045,777 | A | * | 7/1962 | Dintelmann | A47B 13/021 182/153 |
| 3,443,662 | A | * | 5/1969 | Thompson | E04G 1/34 182/155 |
| 4,457,399 | A | * | 7/1984 | Breisch | B25H 1/06 182/151 |
| 4,638,885 | A | * | 1/1987 | Frederick | B25H 1/06 182/151 |
| 4,836,332 | A | * | 6/1989 | Henson | B25H 1/06 182/155 |
| 4,890,693 | A | * | 1/1990 | O'Brien | B25H 1/06 182/151 |
| 4,911,390 | A | * | 3/1990 | Flick | A47B 3/12 182/186.3 |
| 4,938,311 | A | * | 7/1990 | Combs | E04G 1/34 182/155 |
| 4,966,341 | A | * | 10/1990 | Borsani | A47B 13/06 182/181.1 |
| 5,007,502 | A | * | 4/1991 | Shapiro | B25H 1/06 182/151 |
| 5,078,352 | A | * | 1/1992 | Brow | B25H 1/06 182/153 |
| 5,101,932 | A | * | 4/1992 | Trudgeon | B25H 1/06 182/129 |
| 5,119,903 | A | * | 6/1992 | Ulshafer, Jr. | B25H 1/06 182/155 |
| 5,184,697 | A | * | 2/1993 | Crewe | B25H 1/06 182/153 |
| 5,247,976 | A | * | 9/1993 | Matthews | B23Q 3/105 144/286.1 |
| 5,377,779 | A | * | 1/1995 | Slapnicka | E04G 1/34 182/153 |
| 5,404,962 | A | * | 4/1995 | Carter | B25H 1/06 182/153 |
| 5,538,102 | A | * | 7/1996 | Yemini | B25H 1/06 182/153 |
| 5,560,449 | A | * | 10/1996 | Smith | B25H 1/06 182/153 |
| 5,908,182 | A | * | 6/1999 | Stang | B25H 1/06 248/188.2 |
| 6,059,071 | A | * | 5/2000 | Appezzato | B25H 1/06 182/181.1 |

(Continued)

*Primary Examiner* — Monica Millner
(74) *Attorney, Agent, or Firm* — McNees Wallace & Nurick LLC

(57) ABSTRACT

A self-adjusting support assembly for use on uneven surfaces that includes a support element; at least one pivoting leg assembly positioned beneath the support element; and at least one self-adjusting attachment assembly that connects the support element to the at least one pivoting leg assembly, and wherein the at least one self-adjusting attachment assembly further includes: at least one bracket that is adapted to attach to the support element, and wherein the at least one bracket further includes: a receiving channel formed therein that is positioned along an angled axis of insertion, and a locking ridge positioned in the receiving channel; and a proximal head portion that is adapted to rotationally cooperate with at least one bracket and to receive the at least one pivoting leg assembly, and wherein the proximal head portion further includes: a flange formed at one end thereof that rotationally engages the locking ridge; a stem positioned beneath the flange, wherein the stem rotationally engages the receiving channel; and a receiving portion positioned beneath the stem that is adapted to receive the at least one leg assembly.

20 Claims, 16 Drawing Sheets

(56) References Cited

U.S. PATENT DOCUMENTS

| | | | | |
|---|---|---|---|---|
| 6,564,903 B2 * | 5/2003 | Krajec | ................... | B25H 1/06 182/153 |
| 6,681,895 B2 * | 1/2004 | Virtue | ...................... | B25H 1/06 182/153 |
| 6,810,996 B2 * | 11/2004 | Rump | ...................... | B25H 1/06 182/153 |
| 7,172,053 B2 * | 2/2007 | Slavich | ................... | B25H 1/06 182/153 |
| 2003/0047384 A1 * | 3/2003 | Blackwell | ................ | B25H 1/06 182/153 |
| 2004/0124036 A1 * | 7/2004 | Ulshafter, Jr. | ........... | B25H 1/06 182/153 |
| 2005/0045422 A1 * | 3/2005 | Remmers | ................. | B25H 1/06 182/153 |
| 2010/0224446 A1 * | 9/2010 | Bulley | ...................... | B25H 1/06 182/153 |
| 2013/0306806 A1 * | 11/2013 | Hoyle | .................... | F16M 11/00 248/121 |

* cited by examiner

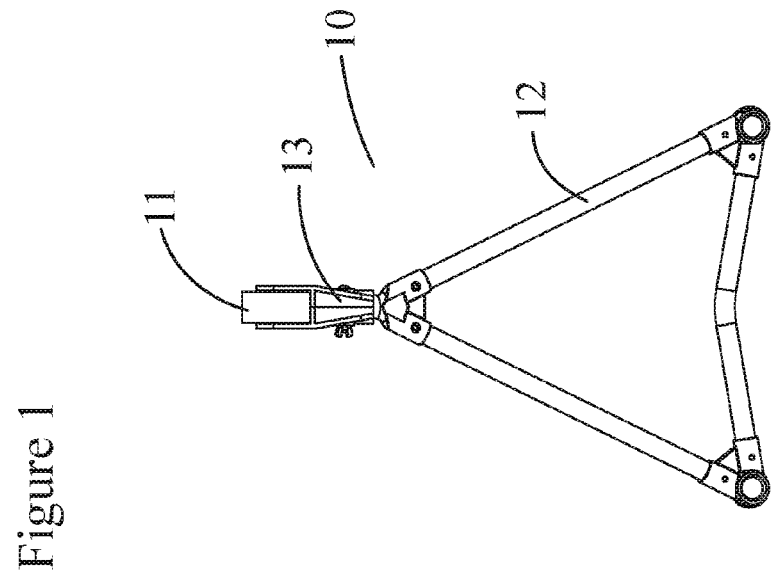
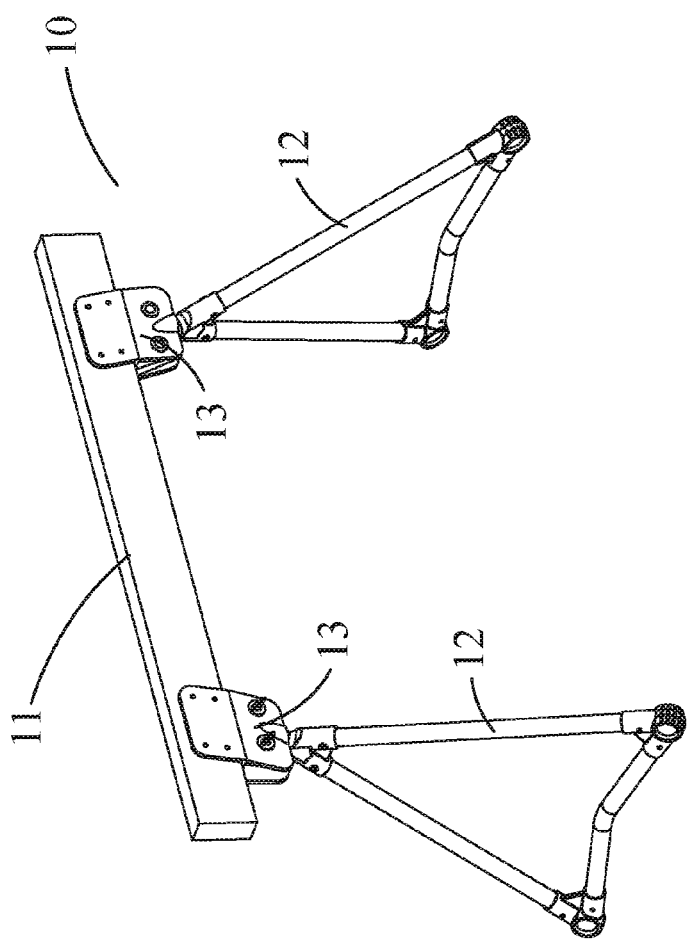
Figure 1

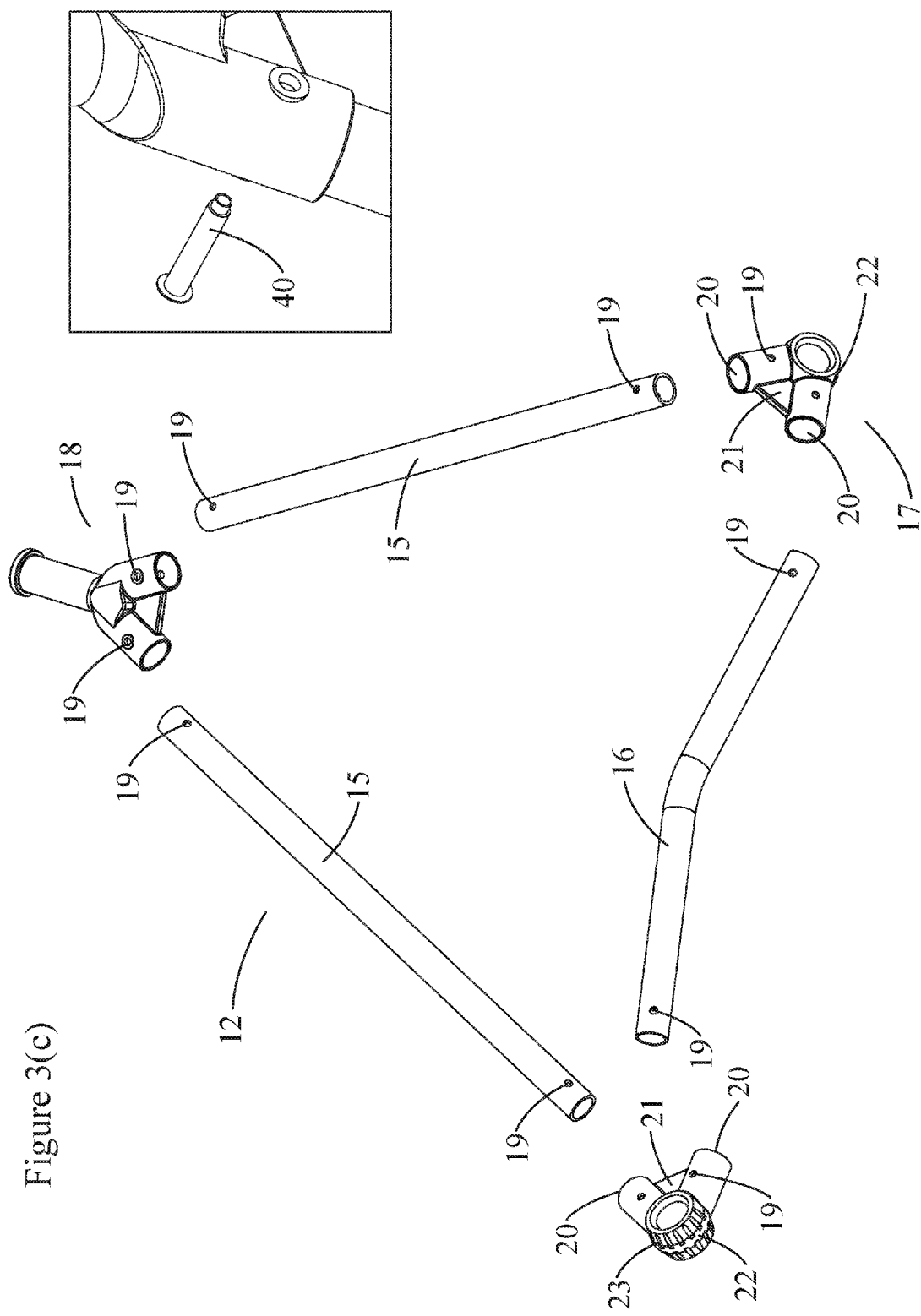

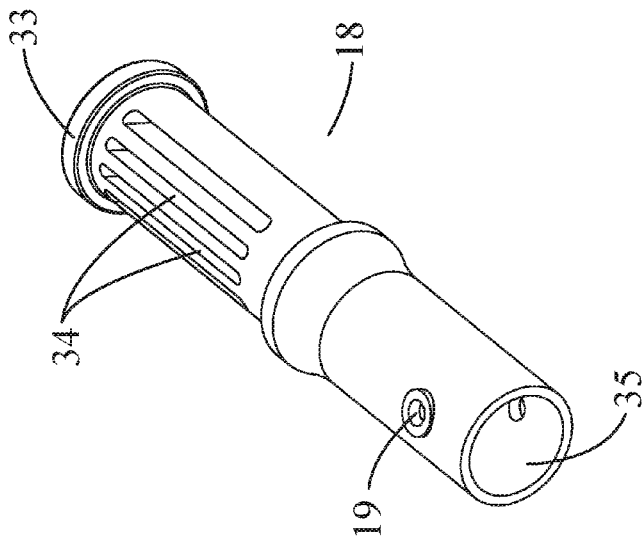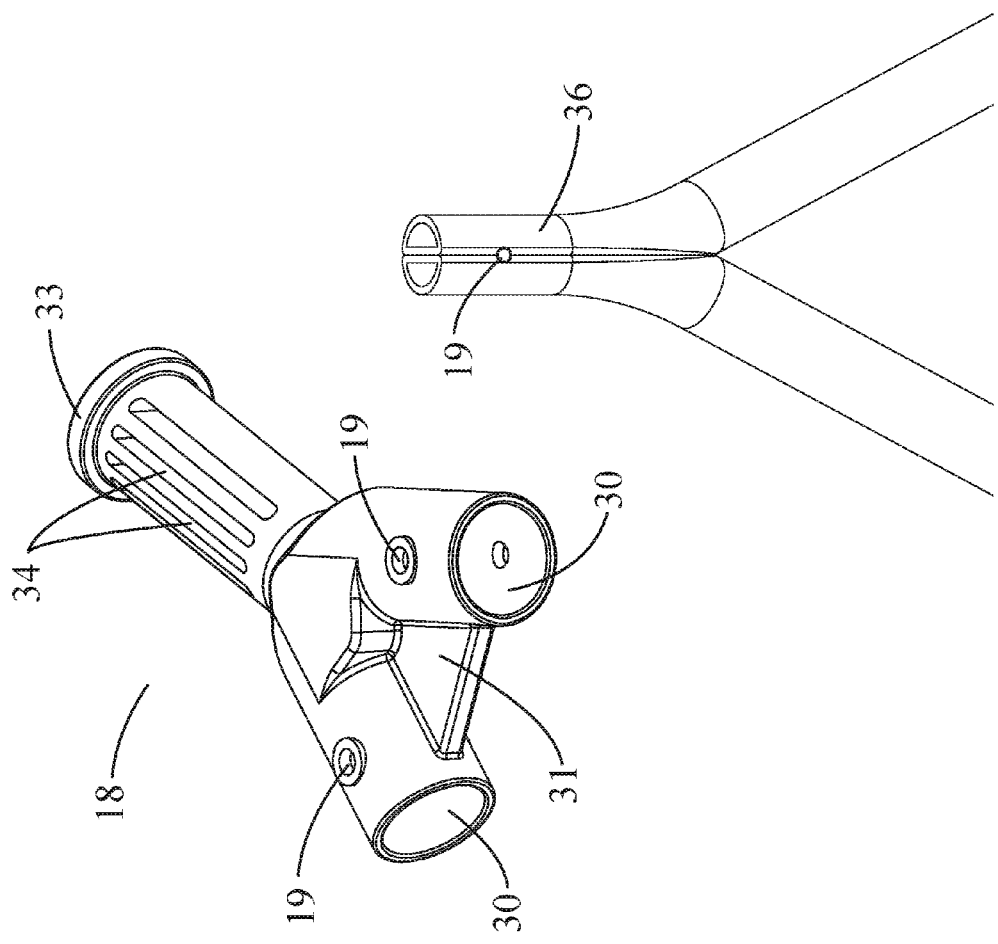
Figure 4(a)
Figure 4(b)

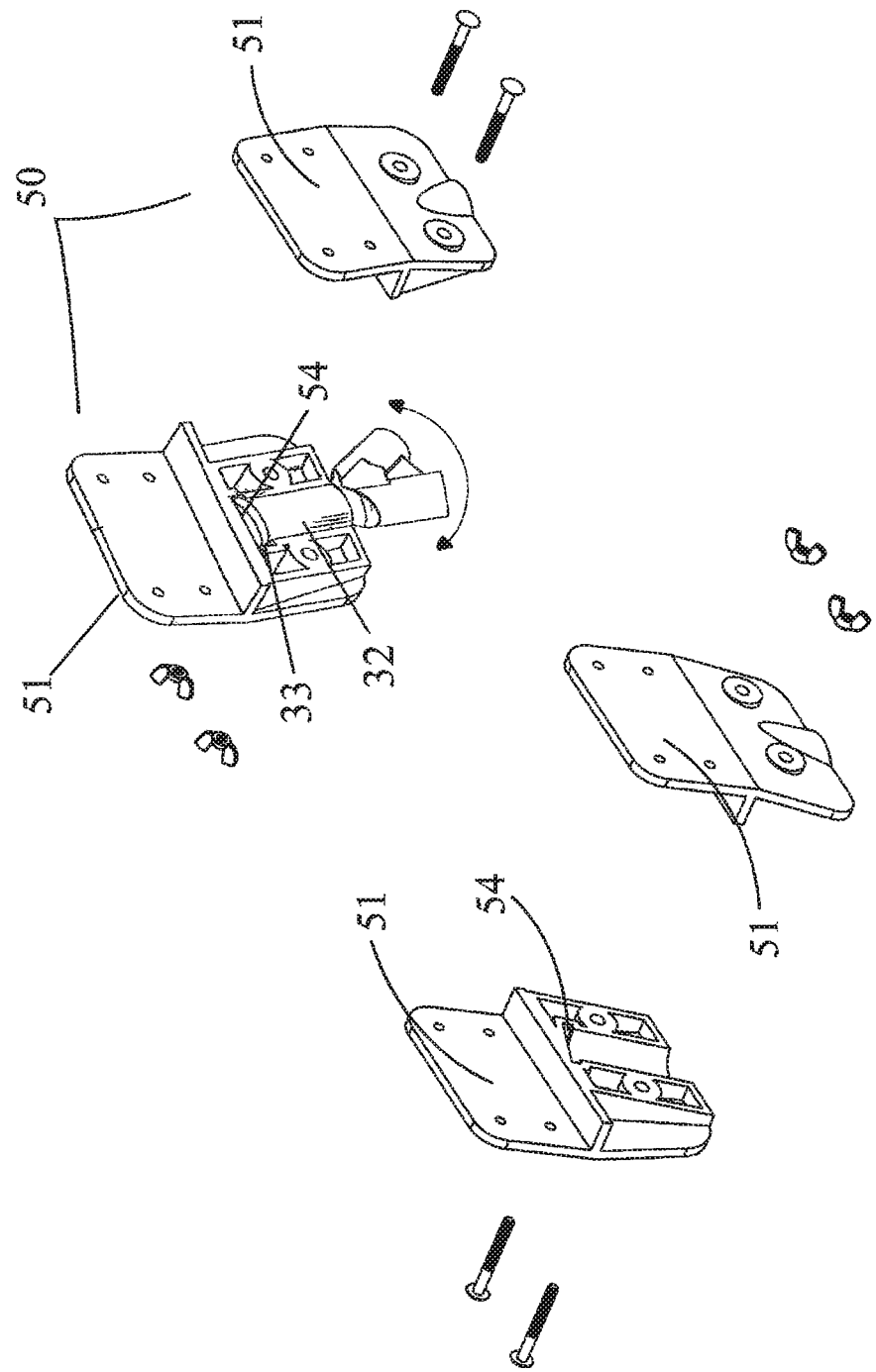

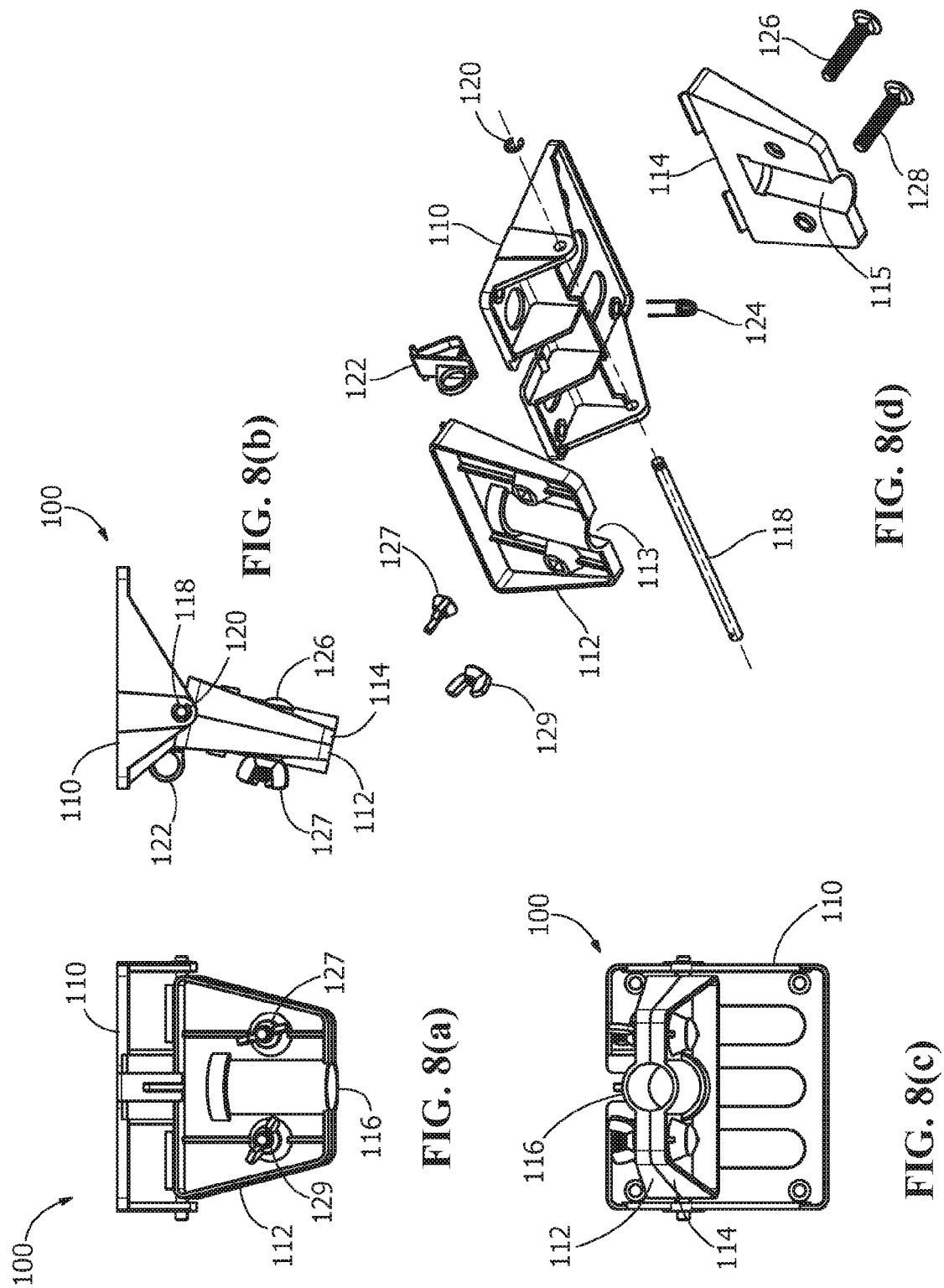

SELF-LEVELING UTILITY PLATFORM

CROSS-REFERENCE TO RELATED APPLICATIONS

This patent application is a continuation-in-part of U.S. patent application Ser. No. 13/889,093 filed on May 7, 2013 and entitled "Adjustable Assembly for Providing All-Terrain Support to Tables and Other Structures", the disclosure of which is hereby incorporated by reference herein in its entirety and made part of the present U.S. utility patent application for all purposes.

BACKGROUND OF THE INVENTION

Achieving a steady and level support surface has long been a challenge. Conventional support legs are static—they are not designed to be adjusted which means that the stability of the table or other rest or work surface relies on the contact points of the legs all resting on a single plane. If one or more of the legs of a support structure is not firmly contacting the underlying terrain, the support structure will be disposed to wobble, tilt or sway, thereby destabilizing the structure and throwing the support surface off level. Most people have experienced this problem with a wobbly cafe or picnic table that adversely affects the dining experience. Additionally, if the support structure is used for work that involves sawing or other reciprocating motions, the instability caused by uneven terrain combined with the vibrational motion can cause the support structure to migrate on the terrain and possibly overturn, causing unsafe conditions for the user and the work product. Finally, if one or more of the legs of a support structure is not firmly contacting the underlying terrain, then independent of the use of the support surface, the structural integrity of the support structure can be compromised, leading to structural damage and potential collapse.

A conventional sawhorse is one example of a work surface that can present danger to a user if it is not stable. The typical sawhorse assembly, which includes a horizontal beam as the support element, is typically made of wood, and two A-shaped legs formed from wooden boards, wherein the legs are attached to the beam in either a fixed or removable manner. The advantage to the typical sawhorse assembly is its robustness as a strong, durable support. But because a typical sawhorse assembly cannot be readily adjusted for adaptation to variable terrain, it may present a work surface that is ultimately unsteady and prone to tipping. Such instability presents hazards to both the user and the job-site work product, particularly when sharp and powered tools are being used. The static design of the sawhorse is also inefficient and cumbersome for purposes of portability and storage due to its overall shape. Indeed, because of its awkward shape and the attendant difficulty with storage and transportation, the sawhorse is often constructed and deconstructed on the job site.

There are many other instances where it is desirable or necessary to use a support surface on terrain that is not level or flat. Examples of other support surfaces that would benefit from more adjustable support assemblies include tabletops, chairs, work platforms, cooking surfaces, elevated storage containers, and other leg-bearing support surfaces that may be used on variable terrain. In one specific example, outdoorsman encounter widely variable terrain that that can make it difficult to achieve a safe and stable tabletop or other surface suitable for cooking, eating, cleaning fish, dressing game, gear maintenance and storage, and the like. And in yet other specific examples, campers and homeowners are challenged to achieve secure and generally level placement of outdoor tables and chairs.

Over time, numerous designs have been developed to address some of the deficiencies of table, sawhorse and other legs, including designs that employ one or more of telescoping, folding and twisting legs. While these designs can provide enhanced portability and storage, and enable achieving an improved level surface, such designs can suffer from compromised stability, lack of ease of use, and increased cost and complication in their manufacture.

Accordingly, there is a need for a support assembly that is able to provide adjustable and stable support for a variety of support elements, and is suitable for use on even and uneven terrain. There is also a need for such adjustable support assemblies that are easy to use, easy to store, modular to allow for adaptation of a variety of conventional support structures, and relatively simple and inexpensive to produce.

SUMMARY OF THE INVENTION

The present application describes various exemplary adjustable support assemblies, modules, kits and methods for providing adjustable and stable support to a variety of work surfaces. Examples of work surfaces that can benefit from the below described assemblies include tables, chairs and other structures with three, four or more conventional legs, sawhorses, picnic tables and other structures that have two or more conventional A-shaped legs, tables and other surfaces that are supported by a pedestal, and yet other support surfaces that rely on one or more conventional legs or supports.

Exemplary embodiments of adjustable support assemblies include a support element, two or more legs, and corresponding leg exchange brackets, each adapted for attachment to a support element and a leg. In an exemplary embodiment, a leg includes a stem that is attached by insertion into a receiving portion of a leg exchange bracket, enabling the leg to rotate within the leg exchange bracket around an insertion axis. By differential rotation of each of the two or more legs within its corresponding leg exchange bracket, the user of the support assembly can adjust the elevation of ground contact points on the legs so as to accommodate varying terrain and uneven ground conditions. Rotation of the legs also permits the support assembly to be adapted to lie flat relative to the support element so that the entire assembly may be stored and transported more easily than in its erected state. Adjustment is achieved by actuation of a simple bolt, toggle or nut that is easily actuated without a tool and then lockable to ensure secure and stable fixation of the position of each leg.

In some exemplary embodiments, a support assembly may include a support element adapter, two or more legs, and corresponding leg exchange brackets, the support element adapter configured for engagement with the leg exchange brackets and adapted for interchangeable engagement with a variety of support elements using any suitable fastener. In some such embodiments, the support element adapter may include one or more braces or beams adapted for attachment with any suitable fastener to a support element.

Additional embodiments include a kit for providing replacement, supplemental or enhanced support to a conventional support assembly, such as a table, the kit including components selected from one or more horizontal braces or beams, one or more support element adapters, one or more legs and one or more leg exchange brackets, one or more leg and leg exchange bracket assemblies, one or more fixed (non-adjustable legs), selected fasteners suitable for connection of the components of the kit, and combinations of these.

Yet other embodiments include a tabletop or other support element adapted for receiving one or more of the horizontal braces or beams, legs, leg exchange brackets, leg exchange bracket assemblies, and fixed legs provided in the kits described herein.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 1 shows, in separate panels, a perspective view of an adjustable support assembly according to an embodiment of the invention, wherein the assembly is in the form of a sawhorse with two planar triangular shaped legs, wherein each of the legs is rotated into a position such that the plane of the leg transects a long axis of the beam support element, and an end view of the same adjustable support assembly.

FIG. 3(a) is a perspective view of the leg assembly.

FIGS. 3(c)-(g) show alternate embodiments of a planar triangular leg assembly of the adjustable support assembly embodiments disclosed herein. 3(c) shows a disassembled representation of a planar leg assembly as depicted in FIGS. 3(a) and 3(b) formed of modular rod components connected together with a proximal head and terrain feet connectors; FIG. 3(d) shows a planar leg assembly having tubular sides, a base and sides formed of a bent rod component connected with two spherical contact feet; FIG. 3(e) shows a planar leg assembly having modular sides, and a unitary support base side with two socket connectors for receiving each of the sides; FIG. 3(f) shows a planar leg assembly having two straight tubular sides and a contoured tubular bottom; and FIG. 3(g) shows a planar leg assembly having two straight tubular sides and a support bracket disposed between the two straight tubular sides.

FIG. 4(a) shows an enlarged view of the proximal head portion of the leg assembly as shown in FIGS. 3(a)-(c) showing the detail of the proximal attachment stem.

FIG. 4(b) shows an alternate proximal portion of a leg assembly, wherein the proximal end of the leg is formed by compression of opposing ends of either side rods or a unitary tubular rod to form a substantially cylindrical insertion head which is adapted to be received into a proximal attachment stem.

FIG. 5 shows an exploded view of an adjustable support assembly as shown in FIGS. 1 and 2 showing detail of one embodiment of a leg exchange bracket adapted for receiving a proximal attachment stem of a leg assembly, wherein the leg exchange bracket comprises a channel for receiving a stem, and wherein the flange formed at the end of the proximal attachment stem is shown rotationally engaging the locking ridge formed in the bracket.

FIG. 8(a) is a front view of an alternate embodiment of the present invention, wherein each leg bracket is adapted to pivot relative the table surface to which it is mounted thereby permitting the leg assemblies to fold flat against the underside of the table or platform surface;

FIG. 8(b) is side view of the leg bracket of FIG. 8(a);

FIG. 8(c) is a bottom view of the leg bracket of FIG. 8(a);

FIG. 8(d) is an exploded perspective view of the leg bracket of FIG. 8(a);

DETAILED DESCRIPTION OF THE INVENTION

Figure 2:
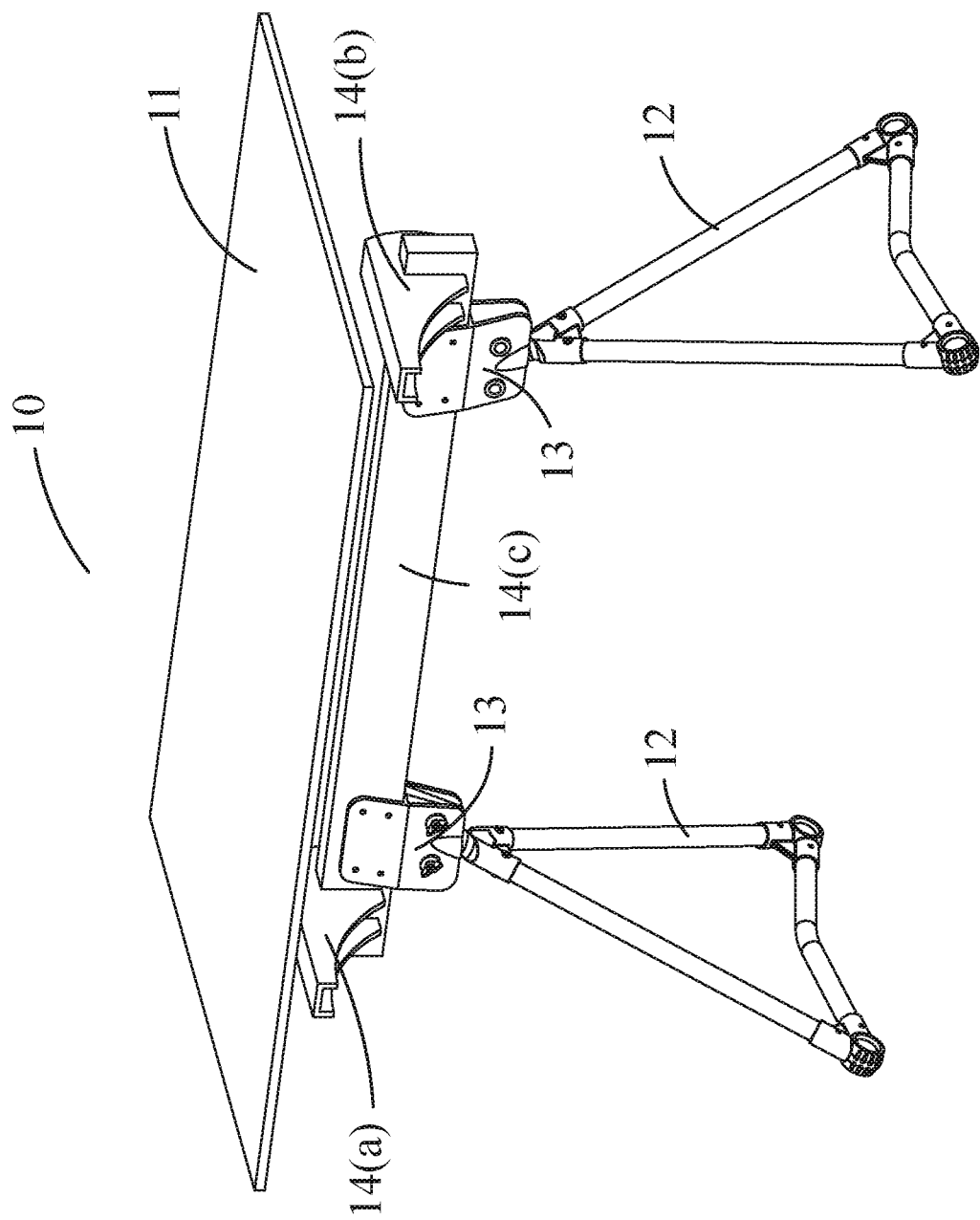
FIG. 2 shows a perspective view of an adjustable support assembly according to an embodiment of the invention, wherein the assembly is in the form of a rectangular table with two planar triangular shaped legs, wherein each of the legs is rotated into a position such that the plane of the leg transects a long axis of the table top support element.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing numerical ranges, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

When discussing the invention, the terms "proximal" and "distal" are used relative to the position of the support element work surface, and not the ground. Thus, proximal means proximate or close to the support element and distal means distant from the work element and close to the ground.

The invention is directed to an adjustable assembly with at least a pair of adjustable legs that is used to stabilize a support element on a wide range of terrains. In some embodiments the adjustable assembly includes a support element, and in other various embodiments, the adjustable assembly is provided in one or more of modules and kits that are used with provided support elements or interchangeably with any of a variety of conventional support elements to provide a support assembly that is stable on a wide range of terrains. In the various embodiments, each of the adjustable legs is engaged with a leg exchange bracket that is adapted for and connected to a support element such as a sawhorse beam, a tabletop, or other support element or support element adapter. Each of the adjustable legs can be variably adjusted to adapt to height and other terrain surface variations so as to provide an steady and generally level support surface. Once the desired adjustment is selected, the legs are optionally locked. If the terrain changes or there is a need to transfer the support surface to another terrain, the legs can be readily unlocked, as desired, the position of one or more legs adjusted, and the lock(s) reengaged, as desired, to provide a steady and generally level assembly on the changed terrain.

Using one of the kits disclosed herein, the adjustable assembly can also be configured so that it can be reversibly engaged with a variety of work surfaces either by removal of the full assembly from the support surface, removal of the assembly from an support element adapter, removal of the legs from their respective leg exchange brackets, or combinations of these. Accordingly, an adjustable support assembly can be readily disengaged from a first support surface, and reengaged with a second support surface. According to the various embodiments, the legs of the assembly are easily adjusted to allow for stacking, storage and for ease of transport of the support surface.

Referring now to the drawings, FIG. 1 shows, in separate panels, a perspective view of an embodiment of an adjustable support assembly 10 comprising a sawhorse support element 11 and an end view of that same assembly. FIG. 2 shows a perspective view of an alternate to the embodiment shown in FIG. 1, wherein the support element 11 in FIG. 2 is a tabletop and the support element 11 is engaged with the assembly of the leg exchange brackets 13 and legs 12 by engagement with a support element adapter 14. Referring again to FIG. 1, the exemplary adjustable assembly 10 includes a support element 11, first and second legs 12, and first and second leg exchange brackets 13, each leg exchange bracket 13 adapted for engagement with a leg 12 and a support element 11, and further adapted to enable independent movement of each leg 12. Referring now to FIG. 2, in the alternate embodiment, the adjustable assembly 10 also includes a support element adapter 14, first and second legs 12, and corresponding leg exchange brackets 13, the support element adapter 14 configured to enable attachment of the leg 12 and leg exchange bracket 13 su assembly of the adjustable support assembly to any of a variety of support elements, such as the table top support element 11 shown. As depicted, the support element adapter 14 comprises two discrete adapter components 14(a) and 14(h) affixed at a distance apart from one another in a generally linear and parallel orientation on the underside of the support element 11 each of which is gripped to a beam element 14(c), to which two leg exchange brackets 13 are also attached. It will be appreciated that in alternate embodiments, a support element adapter may have a different form. For example, a support element adapter may be unitary and adapted to span the length of the underside of the support element 11. In yet other embodiments, a support element adapter may be unitary or modular and may be affixed to the underside of a support element in a circular or semi-circular or other nonparallel configuration. And in yet other embodiments, a support element adapter may be configured to affix to more than one beam or rod elements that in turn can be connected to one or more leg exchange brackets. In all such embodiments, a support element adapter serves as a transitional component that enables modularity of the leg and leg exchange bracket subassembly to allow a user to construct a stable support assembly using standard construction materials or conventional support assemblies, and also allows a user to interchange the support sub assembly between support elements. A support subassembly comprises any two or more support assembly components selected from a support element, leg, leg exchange bracket, and support element adapter.

Some non-limiting examples of support elements include, sawhorse beams, tabletops, chairs, work platforms, portable cooking surfaces, grills, elevated storage containers, and other work surfaces that are supported by one or more feet or legs and provide support for any of a wide variety of uses, display or storage, each support element commonly sharing the requirement of maintaining a steady and generally level position for optimal use, and in some instances being defined by at least one substantially planar work surface. It will be readily appreciated that the nature, size and construction of a support element can vary widely, and that a support element can simply be and include any surface on which a user will use the surface to perform a task, store or display one or more objects. Accordingly, a support element may be any size, shape or length, it may be wide, or narrow such as a sawhorse beam, rod or pole, it may planar and have a square, rectangular, round or some other regular or irregular shape and may be essentially flat or dimensioned such as a cube or other form. Further a support element, as with each of the various support assembly components described herein, made be made of any material that is typically used for a support assembly, including but not limited to plastic, rubber, metal, wood, composites and combinations of any of these.

Again with reference to FIG. 1, in the depicted exemplary embodiment of the support assembly 10, a leg 12 has a substantially planar configuration and a generally triangular shape. In various embodiments, each of the at least two legs 12 has a configuration that is either planar or non-planar and is shaped to provide stable support.

Figure 3B:
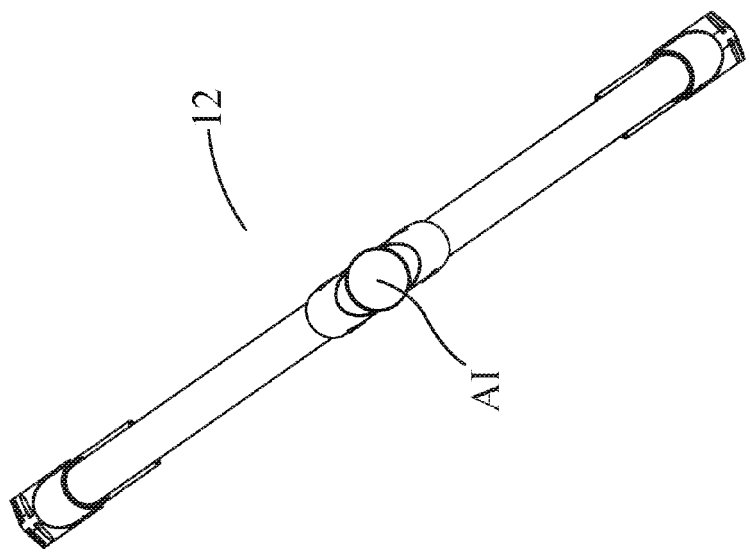
FIG. 3(b) shows a top plan view of the leg assembly.
Figure 3A:
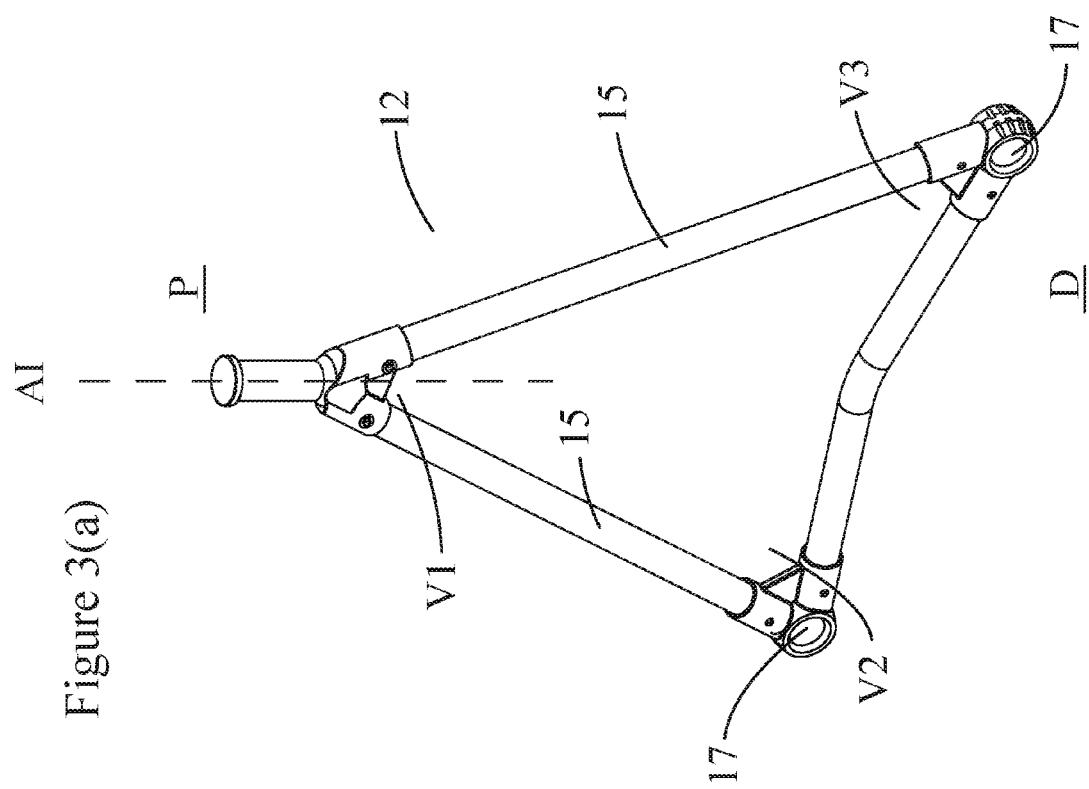
FIGS. 3(a) and (b) show alternate views and embodiments of a planar triangular leg assembly of the adjustable support assembly embodiments disclosed herein.

Referring now to FIGS. 3(a) and 3(b), a single leg 12 is depicted, which corresponds with a leg 12 of the exemplary embodiments depicted in FIG. 1 and FIG. 2. The leg 12 is a modular assembly, and as shown in FIGS. 3(a) and 3(c), forms a substantially planar and triangular shape. Referring now to FIG. 3(c), the leg 12 is depicted unassembled, and comprises three tubular rod elements including two elongate tubular side rods 15 and a shorter slightly arcuate tubular base rod 16 which are assembled by coupling at their ends to form a substantially triangular shape. In accordance with this exemplary embodiment, a leg 12 is adapted for attachment to a leg exchange bracket 13 at a proximal end P of the leg that is defined by one vertex V1 of the triangle, and is adapted for contact with the ground or terrain at a distal end D of the leg 12 that is defined by a base formed by two vertices of the triangle V2 and V3, each of which vertices V2 and V3 is a terrain-contact foot 17.

In other embodiments of the invention, rather than being modular in construction such as the leg 12 described above with reference to FIGS. 3(a)-(c), a leg 12 may be manufactured from a single element. In one such example, a leg 12 may be formed form a single length of rod that is bent to form a general triangular shape. It will be appreciated that in the various alternate embodiments, a leg may be formed from one, two, three or more elements, the elements may be circular, triangular or square in cross section, and may be solid or hollow or combinations thereof, such as, for example, plastic or metal pipes or solid rods, wooden, plastic or composite dowels, beams or boards, and telescoping rods and combinations of these. Further, the elements of leg assemblies according to the invention may be unitary and formed from a plate, or series of parallel or woven or cross-hatched wires or rods, baffles or other planar arrangement. Still further, a leg may be formed from conventional construction materials including but not limited to, metal, wood, compressed wood, composites, plastic, and combinations of any of these.

In some exemplary embodiments a leg 12 includes terrain-contact feet 17 that are attached to a leg 12 and positioned so as to contact the ground when the support assembly is erected. Referring again to FIGS. 3(a)-(c), a pair of terrain-contact feet 17 are shown attached to planar and triangular leg 12, wherein the terrain-contact feet are attached to each of the two vertices V2 and V3 at the distal end D of the leg 12. In some exemplary embodiments, the terrain-contact feet are formed of rubber or similar material and are textured, for example with treads or other structures that enhance traction when in contact with the ground. Referring now to FIG. 3(c), the depicted terrain-contact foot 17 is generally Y-shaped, and includes receiving sockets 20 for engagement with respective ends of tubular side rods 15, a central truss 21 for reinforcement, and a contact region 22 for contact with the ground, the contact region comprising raised ridges or treads 23 to facilitate gripping or traction with the terrain when the support assembly 10 is erected. In other embodiments, a terrain-contact foot 17 may be spherical in shape. It will be appreciated that any number of shapes and structures may be used for a terrain-contact foot, and may be elected as appropriate for optimal engagement with the terrain. It will be appreciated that in other embodiments wherein a leg has a different shape and configuration, there may be fewer terrain-contact points or more terrain-contact points and they may be positioned at vertices or at other positions relative to the body of the leg.

Figure 3E:
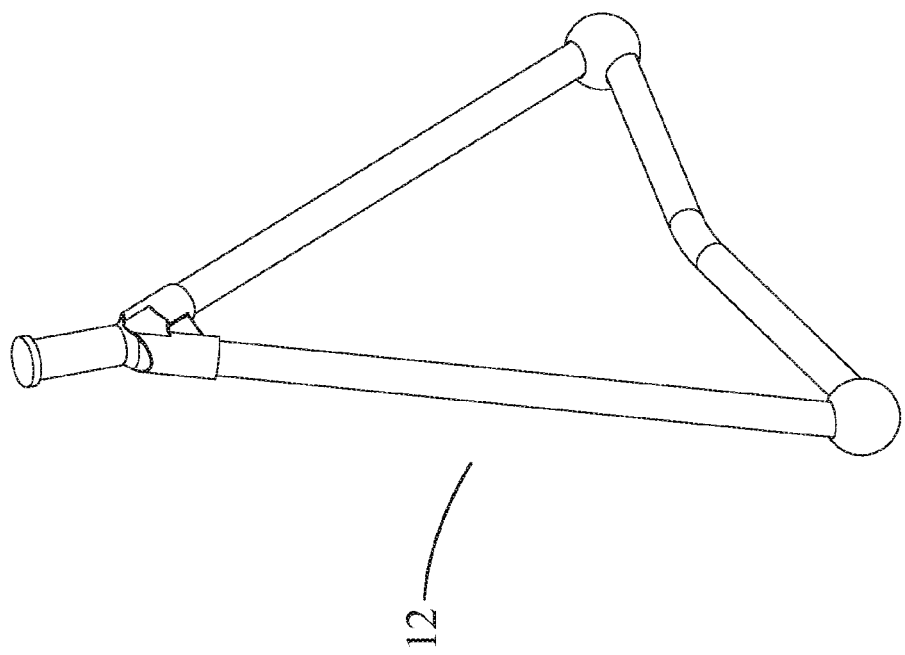
Figure 3D:
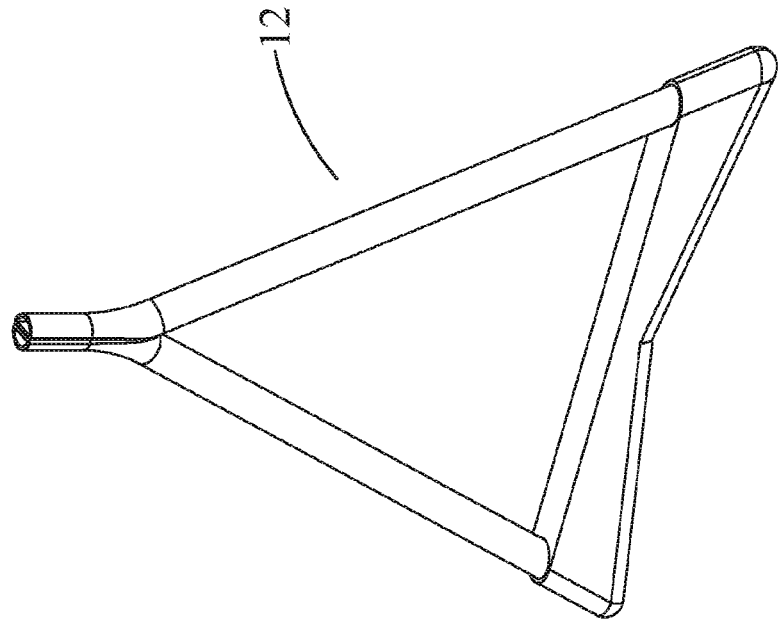
Figure 3G:
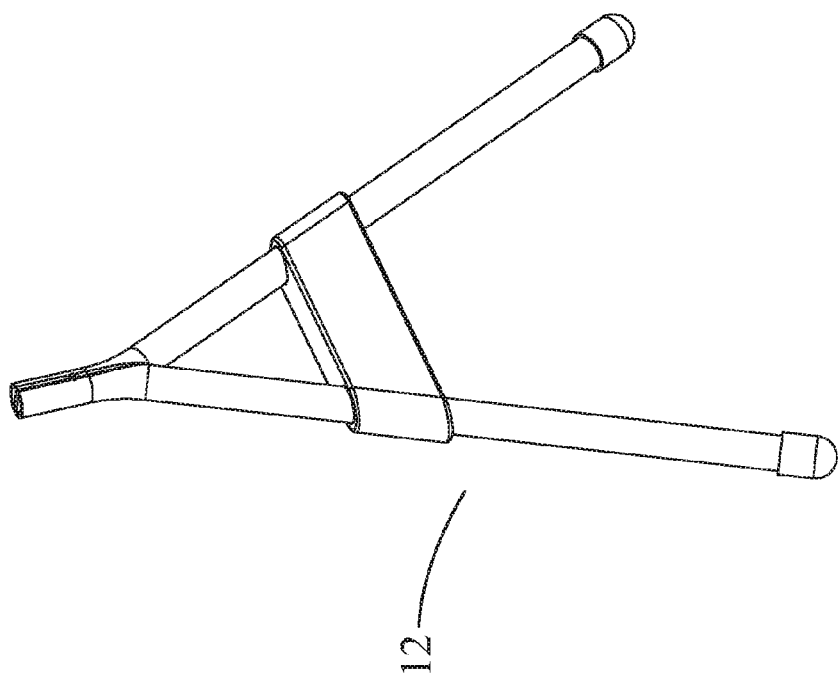
Figure 3F:
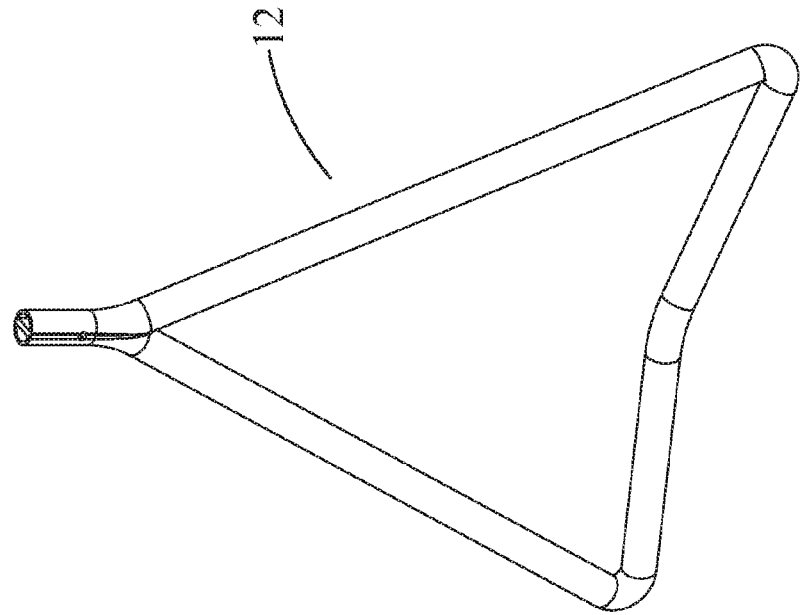

It will be appreciated that in alternate embodiments, the sides 15, base 16 and terrain contact feet 17 of leg assemblies according to the instant invention may have different configurations and shapes and may be formed of varying materials, FIGS. 3(d)-(e) show a variety of such alternate embodiments. FIG. 3(d) shows a planar leg assembly having tubular sides, a base and sides formed of a bent rod component connected with two spherical contact feet. FIG. 3(e) shows a planar leg assembly having modular sides, and a unitary support base in two possible forms each with two socket connectors for receiving each of the sides. In yet other possible embodiments, a leg assembly may be either of unitary construction formed of a single bent tubular rod having a contoured base with attached contact feet, or it may be modular and formed without a base and may include one or more struts or trusses for support.

In various embodiments, a leg may be unitary (that is, formed as a single piece), or modular (that is, formed of two or more pieces). In some embodiments, a substantially planar leg may have an A-shape or a V-shape, and in yet other embodiments a substantially planar leg may have a square or other polygonal shape. In yet other embodiments, a leg is non-planar and has any of a number of shapes, including but not limited to any one of an A-shape, V-shape and polygonal shape. In some embodiments, as shown in FIG. 1, the at least two legs 12 of an adjustable support assembly 10 all share the same shape and configuration, for example, a planar triangle. An adjustable support assembly may, of course, include three or more legs. And in yet other embodiments, each leg of an adjustable support assembly may differ in one or both shape and configuration. In some embodiments, a leg may be adapted for height adjustment, and in other embodiments, a selection of legs that vary in height may be used. In various embodiments, the legs 12 may be constructed of any of a variety of materials, including but not limited to, plastic, rubber, metal, wood, composites and combinations of any of these.

Referring now to FIG. 4(a), in various embodiments, a leg 12 includes a proximal head 18 at leg 12 proximal end P for engagement of the leg 12 with a leg exchange bracket 13. The depicted proximal head 18 is generally Y-shaped and includes leg engagement sockets 30 for engagement with respective ends of rod elements 15, a central truss 31 for reinforcement, and an engagement stein 32. The engagement stem 32 comprises a locking flange 33, and one or more surface features 34, selected from but not limited to one or more of ridges, tracks, grooves, fins and ribs that enhance engagement of the stem 32 with the leg exchange bracket 13.

In accordance with the various embodiments, the modular elements of a leg assembly may be connected by any of a number of fasteners well known in the art, including by welding, glue, screws, collets and other fasteners. In some embodiments, the fasters may be rivets. Referring again to FIG. 3(c), exemplary rivets 40 are shown. Referring again to FIG. 3(c), interfitting components of the leg assembly include through holes 19 that align upon engagement of the components with one another. A rivet is inserted through the aligned through holes and one or both of the rivet's ends are crimped to fix the rivet in place within the aligned through holes, thereby effectively locking the engaged components together.

As described further herein below, a proximal head 18 may have any of a number of other forms and configurations suitable for engagement with a leg exchange bracket. The embodiment shown in FIGS. 3(a)-(c) and FIG. 4(a) wherein the proximal head includes an engagement stem 32 attachment element is merely exemplary. FIG. 4(b) depicts one alternate embodiment. FIG. 4(b) shows an alternate proximal head portion 18 of a leg assembly, wherein the proximal head 18 is generally I-shaped and includes a receiving socket 35 for engagement with the ends of side rod 15 elements. Referring still to FIG. 4(b), in the depicted embodiment the insertion head 36 of the leg 12 is formed by compression of opposing ends of side rod 15 elements to form a substantially cylindrical insertion head 36 which is adapted to be received into the receiving socket 35 of the shown proximal head 18. The depicted proximal head 18 includes an engagement stem 32 of the same type as shown in FIG. 4(b). In yet another embodiment, the proximal head 18 portion of a leg 12 assembly may have a proximal head 18 that is generally Y-shaped and includes at least one receiving sockets for engagement with the end or ends of side rod elements wherein the attachment element is an engagement ball that has a generally spherical or hemispherical in shape and is receivable in a leg exchange bracket that has a corresponding concave spherical receiving socket that operates to receive and restrain the leg for axial rotation and adjustment as described in further detail herein below with respect to the general operation of various embodiments of the leg exchange bracket.

In various embodiments, each leg 12 is engaged in a support assembly 10 by attachment with a leg exchange bracket 13 that is adapted to provide engagement between a leg 12 and the support element 11 or support element adapter 14. Such engagement of a leg exchange bracket 13 with a support element or support element adapter 14 is achieved by use of one or more of screws, nails, bolts, clamps, rivets and other fasteners that enable rigid attachment, the attachment typically on the underside of a support element or to one or more of lateral faces of a support element or support element adapter. The mode of attachment of a leg exchange bracket 13 with a support element 11 may be either permanent or removable, and in some embodiments, a leg exchange bracket may be engaged with an intermediate structure that is itself connectable to a support element, such as a support element adapter or other fixture. A leg exchange bracket 13 is also adapted for engagement with a proximal end of a leg 12, and allows motion of the leg 12 in at least a rotational mode to enable positioning and repositioning of the attached leg, and optionally includes user actuated locking and unlocking.

Referring now to FIG. 5, a perspective view of an embodiment an adjustable support assembly 10 is shown with an exploded view of an embodiment of a leg exchange bracket 13 depicted. In use, the depicted leg exchange bracket 13 is fastened to the support element 11 using any suitable fastener, as described herein. According to the various embodiments, the leg exchange bracket 13 assembly comprises a bracket socket 50 element, which in the depicted embodiment comprises two joined leg exchange bracket plates 51. Each leg exchange bracket plate 51 is adapted for connection with a support element 11. The depicted leg exchange bracket plates 51 are adapted with fastener holes 52 for engagement with a substantially planar surface on the support element 11 and each leg exchange bracket plate 51 is configured to conform to the support element 11 at a first end and to couple together at a second end to receive and enclose a portion of a leg 12, such as an engagement stem 32. As shown in FIG. 5, the leg exchange bracket plates 51 couple to form a substantially cylindrical proximal head-receiving channel 53 for receiving a corresponding engagement stem 32, The proximal head-receiving channel 53 is adapted with an locking ridge 54 to receive and engage the locking flange 33 of the engagement stem 32.

In use, the engagement stem 32 is inserted into the receiving channel 56 along an axis of insertion AI such that the engagement stem 32 is rotatable in the leg exchange bracket 13 around the engagement stem's 32 central axis of insertion and is prevented from pulling out of the channel 56 by interference of the flange 33 with the locking ridge 54. The leg exchange bracket 13 may be adapted with optional adjustable locking fasteners 41. Referring again to FIG. 5, the fasteners 41 are wing nuts that allow a user to variably lock and unlock the engagement of the engagement stem 32 within the stem-receiving channel 56. When fully locked, the surface features 34 of the engagement stein 32 interfere with the walls 57 of the stem receiving-channel 56 to lock the engagement stem 32 in place and prevent further rotation of the engagement stem 32, thereby locking the position of the leg 12 and fixing the position of the distal end D of the leg 12 such that the terrain contact feet 17 are fixed in position for optimal stable placement of the support assembly 10 on the terrain. When the locking fastener 41 is loosened, interference between the surface features 34 of the engagement stem 32 and the walls 57 of the stem-receiving channel 26 are relieved thereby enabling rotation of the engagement stem 32 to allow repositioning of the terrain contact feet 17 of the leg 12.

It will be appreciated that in various embodiments, the flange 23 and the locking ridge 54 may be adapted with pins, notches or other features which serve to limit the range of rotation of the engagement stem 32 within the channel 56, thereby limiting the range of rotation of the leg 12. In alternate embodiments of leg exchange bracket 13 assemblies according to the instant invention, the exchange brackets 13 may be adapted to receive the engagement portion of the proximal head 18 embodiments having differing geometry, such as for example spherical or semispherical forms wherein leg exchange bracket sockets 50 are configured with corresponding geometry to receive the proximal head engagement portions such as by snap fitting.

In various embodiments, the legs of an adjustable support assembly 10 are independently moveable in at least one mode, more particularly a rotational mode, whereby a leg can be rotated about a central axis of insertion AI that is defined by an attachment between the leg and the leg exchange bracket 13 such that the leg can rotate around the attachment axis within a range of at least one (1) degree to about 90 degrees to about 270 degrees and up to about 360 degrees.

Figure 6:
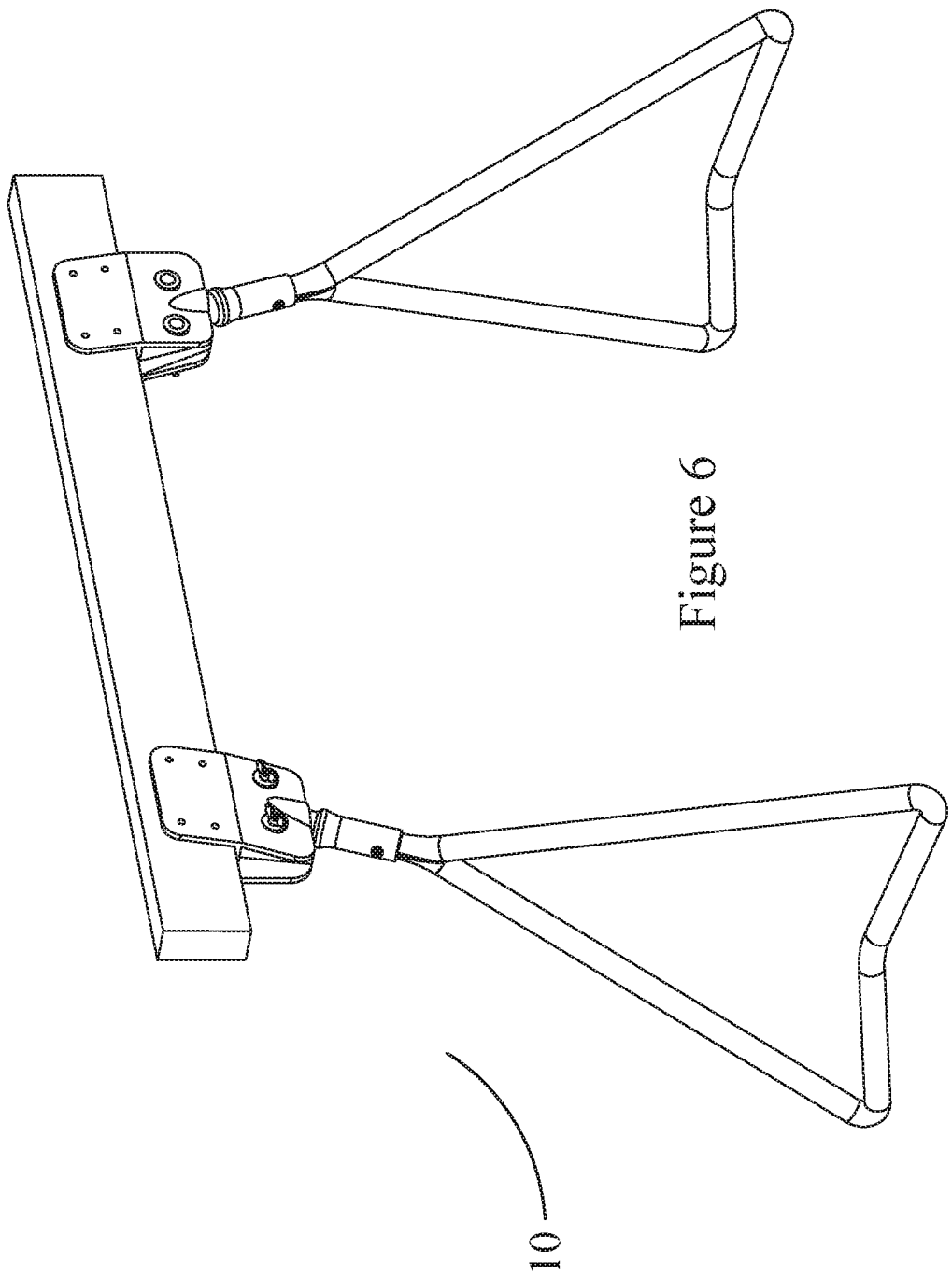
FIG. 6 shows a representative embodiment of an adjustable support assembly.

Referring now to FIG. 6, the depicted support assembly 10 is shown. In its rotational mode, a leg of a support assembly may rotate from any one of 90 degrees to 180 degrees to 270 degrees to 360 degrees, and any incremental degree there between. In a representative embodiment, the rotation of a leg in a leg exchange bracket 13 is 270 degrees. According to the depicted embodiment which comprises two legs, each having an AD of about 15 degrees, the assembly is placed on essentially level (planar) terrain, and each of the leg contact points share the same plane. If the terrain changes, then rotation of a leg from level will cause one contact foot to be elevated relative to the other foot, thereby enabling the selection of positioning of each leg that is optimal to achieve stability of the support assembly. The rotating mode of motion allows a user of the adjustable support assembly to independently adjust the elevation and positioning of the terrain-contact points of each leg with a simple, ergonomic motion to accommodate varying terrain conditions. This adjustability allows a user to achieve and maintain a safe and stable foundation on uneven ground surfaces, and provides a steady and generally level support work surface. It will be appreciated that in various embodiments, independent of the engagement means for the proximal head 18 of a leg 12 and the leg exchange bracket 13, rotation around the axis of insertion is in the range from zero (0) degrees to 360 degrees, and more particularly between 90 degrees to 270 degrees, and limitation on the range of motion between may be achieved by the use of pins, notches or other features that are positioned on each of the proximal head 18 and leg exchange bracket 13 to fix the range of rotation of the leg 12.

In some embodiments, the legs are movable in at least one other mode, for example a hinge mode, whereby a leg can be toggled between a fully extended and a fully retracted position along a path that is perpendicular to and intersects with the axis AI of rotation.

Figure 7A:
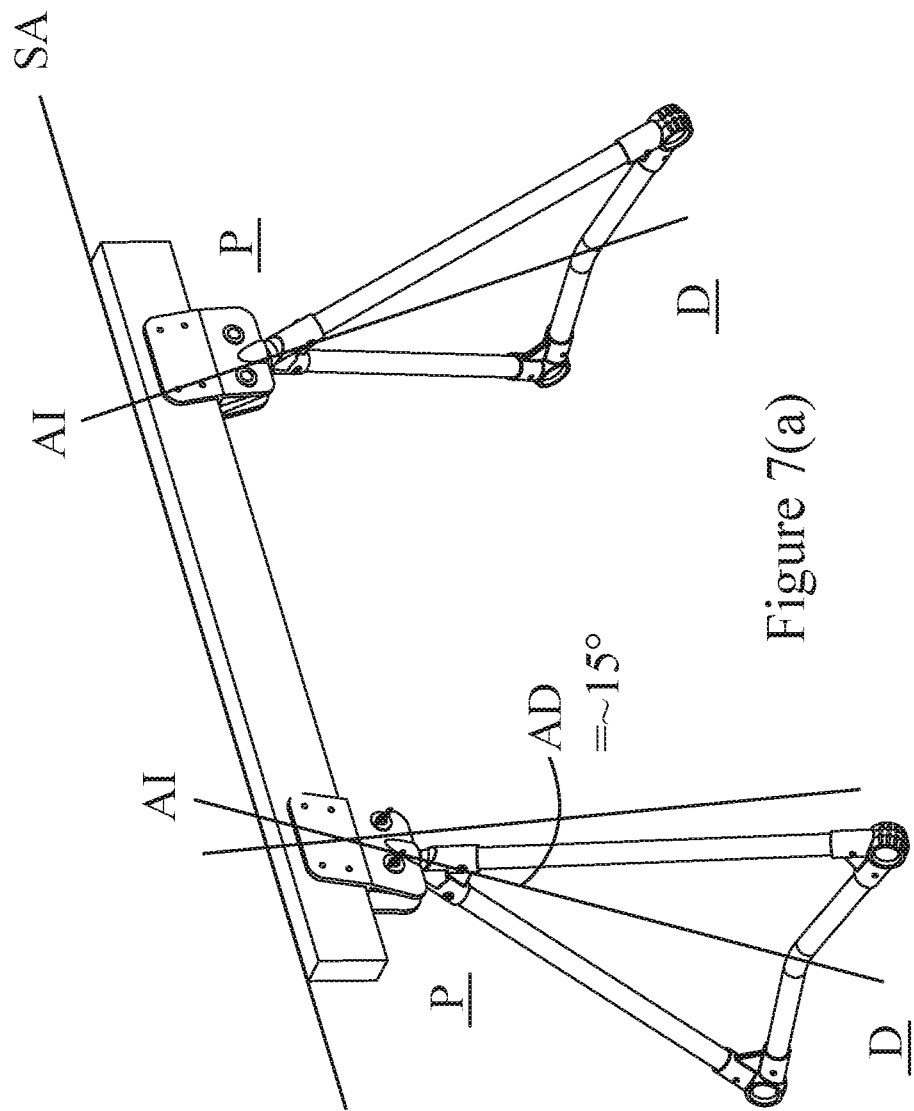
FIG. 7(a) shows an view of the adjustable support assembly shown in FIG. 1, wherein each of the legs is rotated into a position such that the plane of the leg transects a long axis of the beam support element (SA), wherein each leg is deflected outwardly, away from the center of the support structure and at an angle of approximately 15 degrees relative an axis that is perpendicular to the plane of the support surface.

Referring now to FIG. 7(a), the depicted embodiment of the adjustable support assembly is shown deployed for use, wherein the work surface is a sawhorse comprising a beam support element 11. In the depicted embodiment, each of the legs is rotated into a position such that the plane of each leg transects a long axis of the beam support element (SA), each leg 12 is deflected outwardly, away from the center C of the support structure and at an angle of deflection AD that is approximately 15 degrees relative an axis that is perpendicular to the plane SP of the support surface, or expressed alternatively, is at an angle that is 75 degrees relative to the plane SP of the support surface. In accordance with various embodiments, the angle of deflection AD is optimally within the range from 0 to 20 degrees away from the vertical of the axis that is perpendicular to the plane of the support surface. As mentioned, the AD in the depicted embodiment is about 15 degrees, which is within a range from 12 degrees to 17 degrees that is ideal for achieving a wide range of adjustability for contact with the terrain while providing adequate support for the support assembly without risk of collapse. It will be appreciated that according to an embodiment (not shown) wherein the AD is zero (0) degrees, the axes of the legs 12 are parallel to the axis that is perpendicular to the plane SP of the support surface (that is, perpendicular to the SP). According to such embodiment, the legs 12 provide full support for the support assembly and are fully rotatable within the axis AI of insertion; however, the terrain contact feet 17 are essentially limited to a single plane. It will further be appreciated that at any angle of deflection AD that is greater than zero degrees and up to 90 degrees; wherein the axes of the legs 12 are not parallel with one another, the legs 12 will provide for the maximum range of adaptability to variable terrain.

It will be appreciated that stable positioning of a support assembly can be enhanced by use of terrain contact feet materials that are optimized both for the surface properties of the terrain and the degree of the angle of deflection that is desired in an assembly. This selection is particularly of value to enhance the gripping of the fit and to discourage slipping or migration of the support assembly on the terrain.

Figure 7B:
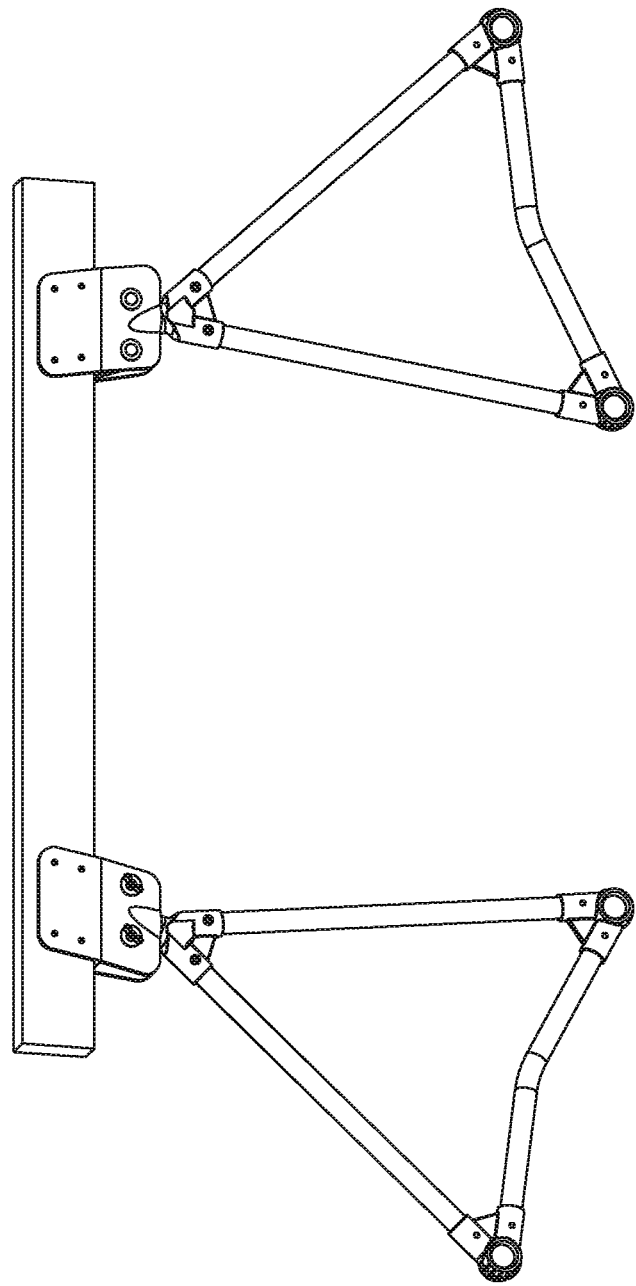
FIG. 7(b) shows an alternate view of the adjustable support assembly shown in FIG. 1, wherein each of the legs is rotated into a position such that the plane of the leg is essentially parallel to a long axis of the beam support element (SA), and the plane of each leg is essentially parallel to the side plane of the support beam.

Referring again to the figures, FIG. 7(b) shows an alternate view of the adjustable support assembly shown in FIG. 1, wherein each of the legs is rotated into a substantially co-planar configuration allowing the assembly 16 to lie flat and be stackable for easy transport and storage. As shown, the plane of each leg 12 is essentially parallel to a long axis SA of the beam support element, and essentially parallel to the side plane of the support beam. It will be appreciated that these embodiments are merely representative, and are by no means limiting with respect to the support surfaces and support elements that can be adapted for adjustable positioning in accordance with the invention.

FIGS. 8(a)-(d), 9(a)-(c), 10, and 11(a)-(b) provide various views of alternate embodiments of the present invention wherein the leg assemblies pivot to fold against the tabletop, platform, or support component of the device, and wherein the self-leveling components have been adapted to be mounted to an I-beam structure or to other structures. Alternate embodiments of the bracket component are also shown in these Figures, as are alternate methods and structures for attaching the brackets and leg assemblies to the tabletop, platform, or support component of the self-leveling platform.

FIGS. 8(a)-(d) show an embodiment of the present invention, wherein each leg bracket 100 is adapted to fold relative the table surface to which it is mounted thereby permitting leg assemblies 300 to fold flat against the underside of the table or platform surface. In this embodiment, each hinged leg bracket 100 includes a leg bracket mount 110, which attaches to the underside of a table top or platform; first leg bracket portion 112; which includes cylindrical recess 113 formed therein; and second leg bracket portion 114, which includes cylindrical recess 115 formed therein. Cylindrical recesses 113 and 115 together form channel 116, which extends through each leg bracket 100 for receiving pivoting proximal head portion 302. As shown in FIG. 8(d), leg bracket 100 further includes hinge pin or rod 118; positional latch 122; and torsion spring 124; as well as first carriage bolt 126; first wing nut 127; second carriage bold 128; and second wing nut 129, which are used to secure first leg bracket portion 112 to second leg bracket portion 114.

Figure 9B:
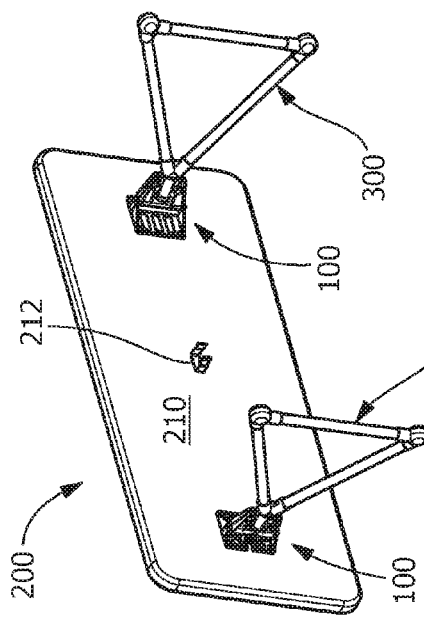
FIG. 9(b) is a bottom perspective view of the self-leveling of FIG. 9(a) showing the leg assemblies in the extended position.
Figure 9C:
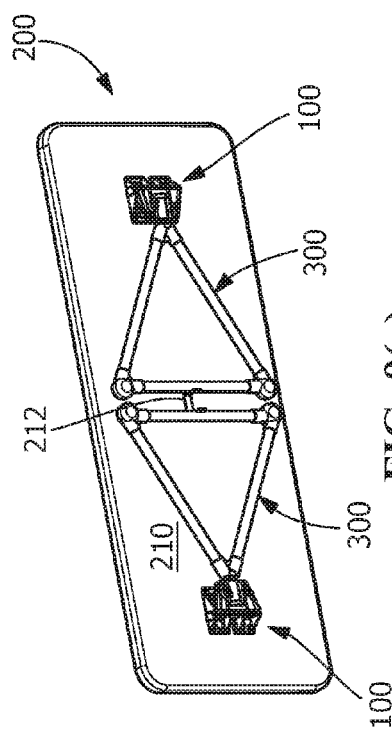
FIG. 9(c) is a bottom perspective view of the self-leveling table of FIG. 9(a) showing the leg assemblies in the folded position.
Figure 9A:
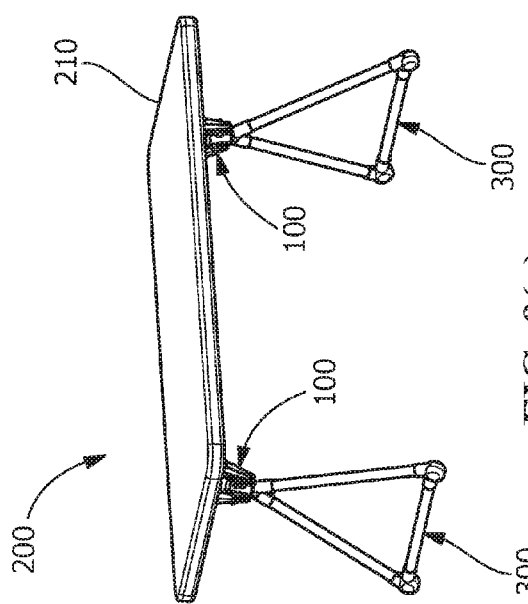
FIG. 9(a) is a side perspective view of a self-leveling table in accordance with an exemplary embodiment of the present invention.
Figure 10:
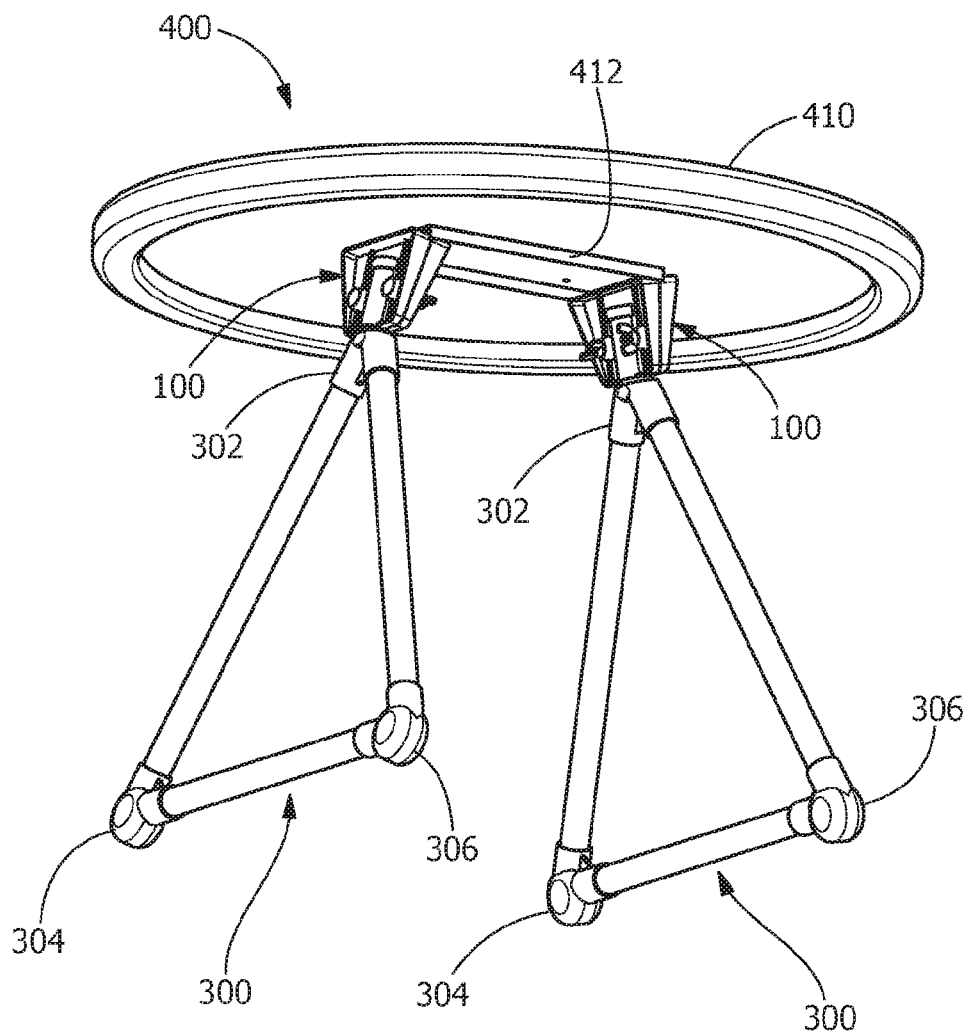
FIG. 10 is a bottom perspective view of a self-leveling table in accordance with an exemplary embodiment of the present invention, wherein the table surface is circular in shape; and wherein the leg assemblies may be folded.

FIGS. 9(a)-(c) show an embodiment of the present invention, wherein self-leveling platform or table 200 includes multiple hinged leg brackets 100, such as those shown in FIGS. 8(a)-(d), which permit triangular leg assemblies 300 to fold flat against the underside of the table or platform surface 210. FIGS. 9(a) and 9(b) show leg assemblies 300 in an extended position and FIG. 9(c) shows leg assemblies 300 in a folded position, which facilitates storage and/or transport of self-leveling platform or table 200. FIG. 10 shows an embodiment of the present invention, wherein self-leveling platform or table 400 includes a platform 410 that is round or circular in shape. In this embodiment, multiple leg brackets 100, such as those shown in FIGS. 8(a)-(d), are attached to table bracket 412 in a hinged manner; which permits triangular leg assemblies 300 to fold. As shown in the Figures and as described above, each triangular leg assembly includes pivoting proximal head portion 302, first corner contact foot 304, and second corner contact foot 306, in addition to the three tubular leg portions positioned between these structures.

Figure 11A:
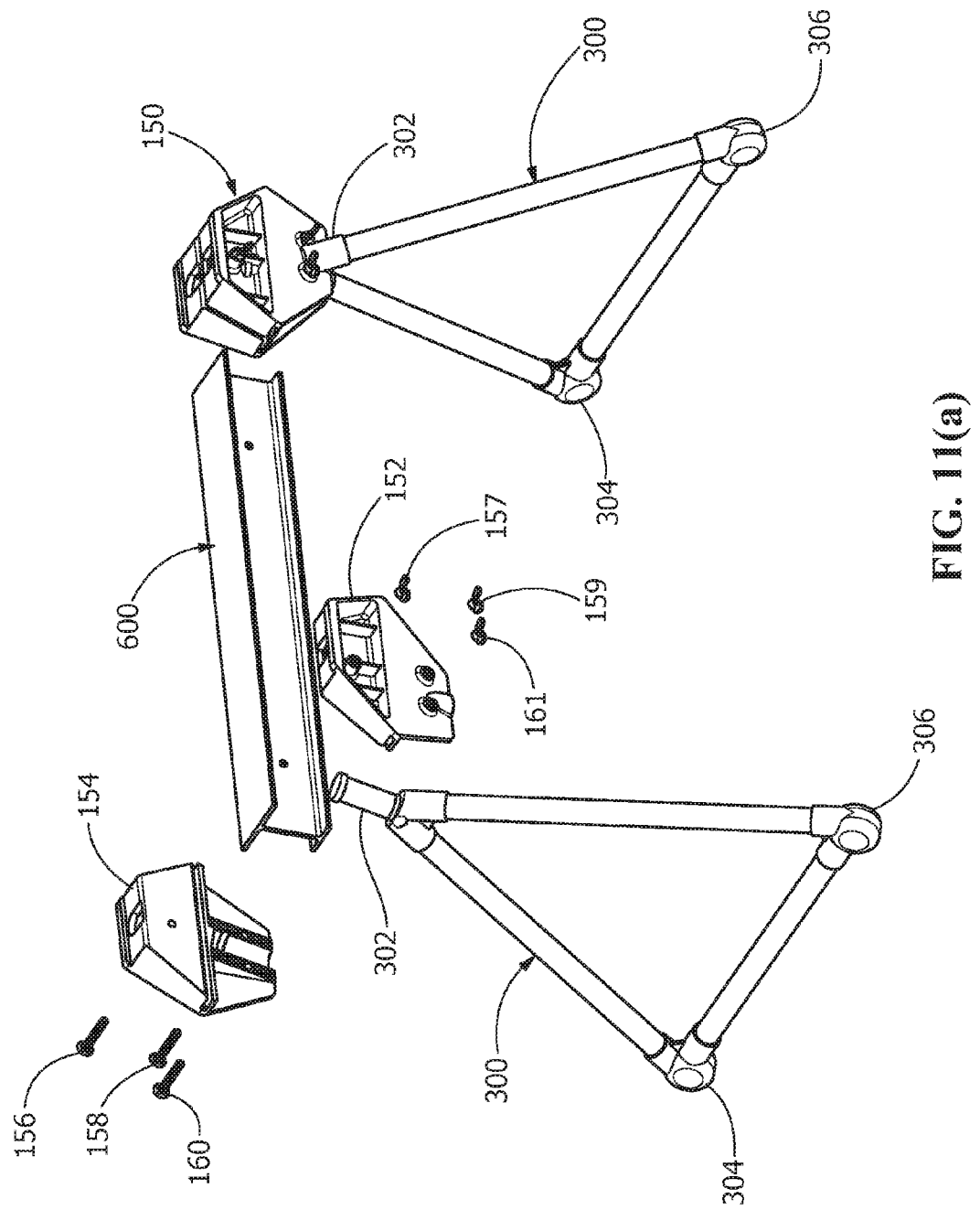
FIG. 11(a) is an exploded perspective view of an exemplary embodiment of the present invention wherein the leg brackets attach to an I-beam structure.
Figure 11B:
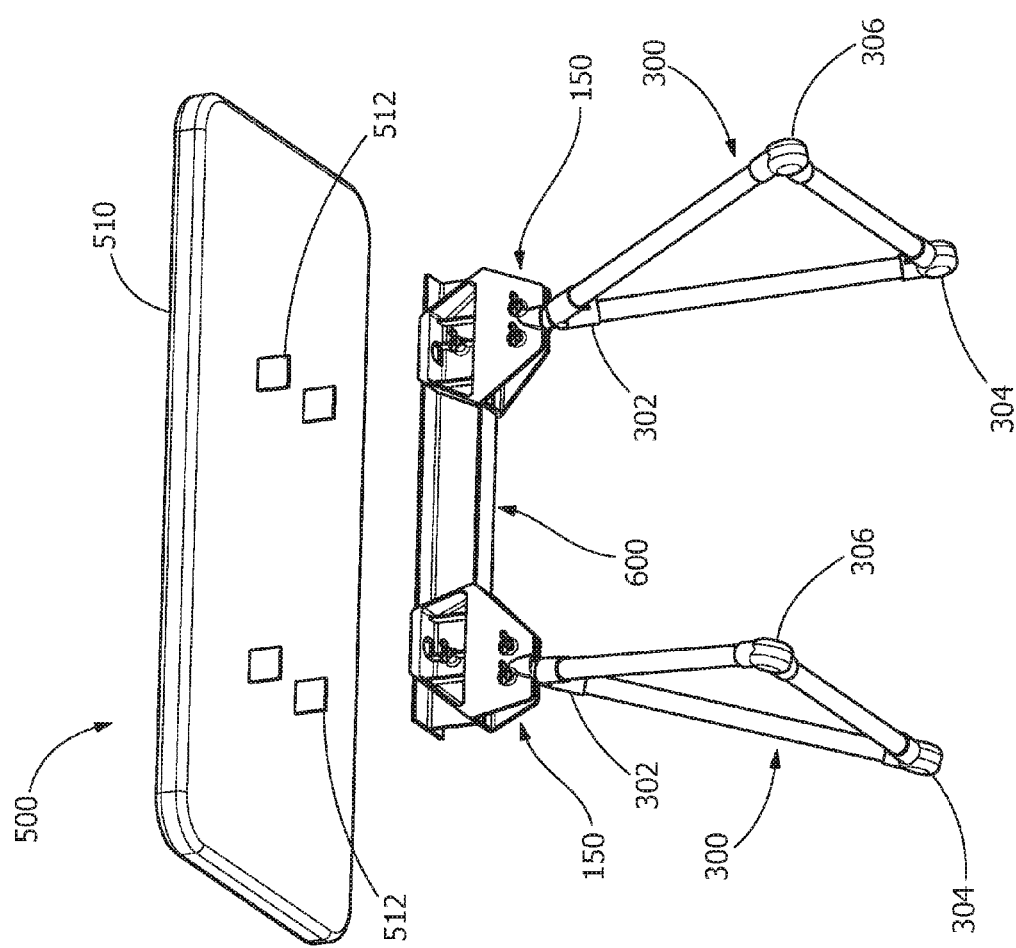
FIG. 11(b) is a partially exploded perspective view of a self-leveling table in accordance with an exemplary embodiment of the present invention, wherein the table surface is attached to an I-beam structure.

FIG. 11(a)-(b) show an embodiment of the present invention, wherein self-leveling platform or table 500 includes leg brackets 150 that attach to I-beam structure 600, to which horizontal platform 510 attaches by way of tabs or clips 512. In this embodiment, each leg bracket 150 includes first leg bracket portion 152 and second leg bracket portion 154, which are connected to one another using first carriage bolt 156; first wing nut 157; second carriage bolt 158; second wing nut 159; third carriage bolt 160; and third wing nut 161. As shown in the Figures and as described above, each triangular leg assembly includes pivoting proximal head portion 302; first corner contact foot 304, and second corner contact foot 306, in addition to the three tubular leg portions positioned between these structures.

It will be appreciated that the components of the various embodiments of the adjustable support assembly are designed for modularity such that the benefits of the invention can be realized in fully assembled products such as tables, chairs, sawhorses and other assembled items that include the leg exchange bracket and leg assemblies disclosed herein for achieving virtually unlimited adjustability to level and stabilize the assemblies on variable terrain. The components are also ideally adapted for modular use so that sub-assemblies of legs and leg exchange brackets can be used for interchangeable attachment to any of a variety of support elements, including existing conventional products such as tables, chairs and the like. Kits including the modular components allow a user to retrofit conventional items for enhanced adjustability and use. Various embodiments of such kits include: support element adapters that can be affixed to a support surface and are adapted for engagement with a support assembly; sub-assemblies of legs and leg exchange brackets that may be assembled with support element adapters; sub-assemblies of legs and leg exchange brackets that may be assembled and are adapted to be directly affixed to a support surface without a support element adapters; legs adapted for engagement with leg exchange brackets and available in a range of heights, sizes, shapes and foot styles for use on a variety of different surfaces; and other combinations of the elements disclosed herein.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A self-adjusting support assembly for use on uneven surfaces, comprising:
   (a) a support element;
   (b) at least one pivoting leg assembly positioned beneath the support element, wherein the at least one pivoting leg assembly is triangular in shape; and
   (c) at least one self-adjusting attachment assembly, wherein the at least one self-adjusting attachment assembly connects the support element to the at least one pivoting leg assembly, and wherein the at least one self-adjusting attachment assembly further includes:
   (i) at least one bracket, wherein the at least one bracket is adapted to attach to the support element, and wherein the at least one bracket further includes:
      a) a receiving channel formed therein, wherein the receiving channel is positioned along an angled axis of insertion, and
      b) a locking ridge positioned in the receiving channel; and
   (ii) a proximal head portion, wherein the proximal head portion is adapted to rotationally cooperate with at least one bracket and to receive the at least one pivoting leg assembly, and wherein the proximal head portion further includes:
      a) a flange formed at one end thereof, wherein the flange rotationally engages the locking ridge;
      b) a stem positioned beneath the flange, wherein the stem rotationally engages the receiving channel; and
      c) a receiving portion positioned beneath the stem, wherein the receiving portion is adapted to receive the at least one leg assembly.

2. The assembly of claim 1, further comprising a support surface attached to the support element, wherein the support surface is perpendicular to the support element.

3. The assembly of claim 1, wherein the at least one pivoting leg assembly further includes multiple tubular leg sections, and wherein the multiple tubular leg sections are connected to one another in a planar configuration.

4. The assembly of claim 1, wherein the angled axis of insertion of the receiving channel is deflected outward from an axis that is perpendicular to a surface plane of the support element, and wherein the angle of deflection is between 2 degrees and 20 degrees.

5. The assembly of claim 1, wherein the angled axis of insertion of the receiving channel is deflected outward from an axis that is perpendicular to a surface plane of the support element, and wherein the angle of deflection is between 13 degrees and 17 degrees.

6. The assembly of claim 1, wherein the angled axis of insertion of the receiving channel is deflected outward from an axis that is perpendicular to a surface plane of the support element, and wherein the angle of deflection is 15 degrees.

7. The assembly of claim 1, wherein the at least one pivoting leg assembly can be rotated from 1 degree to 360 degrees around the angled axis of insertion.

8. The assembly of claim 1, wherein the at least one pivoting leg assembly can be rotated 180 degrees around the angled axis of insertion.

9. The assembly of claim 1, further comprising at least one locking element for preventing rotation of a leg assembly around the angled axis of insertion.

10. A self-adjusting support assembly for use on uneven surfaces, comprising:
   (a) a support element;
   (b) at least one pivoting leg assembly positioned beneath the support element, wherein the at least one pivoting leg assembly is triangular in shape; and
   (c) at least one self-adjusting attachment assembly, wherein the at least one self-adjusting attachment assembly connects the support element to the at least one pivoting leg assembly, and wherein the at least one self-adjusting attachment assembly further includes:
   (i) at least one bracket, wherein the at least one bracket is adapted to hingeably attach to the support element, and wherein the at least one bracket further includes:

a) a receiving channel formed therein, wherein the receiving channel is positioned along an angled axis of insertion, and
b) a locking ridge positioned in the receiving channel; and
(ii) a proximal head portion, wherein the proximal head portion is adapted to rotationally cooperate with at least one bracket and to receive the at least one pivoting leg assembly, and wherein the proximal head portion further includes:
a) a flange formed at one end thereof, wherein the flange rotationally engages the locking ridge;
b) a stem positioned beneath the flange, wherein the stem rotationally engages the receiving channel; and
c) a receiving portion positioned beneath the stem, wherein the receiving portion is adapted to receive the at least one leg assembly; and
(d) a support surface attached to the support element, wherein the support surface is perpendicular to the support element.

11. The assembly of claim 10, wherein the support element is configured as an I-beam.

12. The assembly of claim 10, wherein the at least one pivoting leg assembly further includes multiple tubular leg sections, and wherein the multiple tubular leg sections are connected to one another in a planar configuration.

13. The assembly of claim 10, wherein the at least one pivoting leg assembly can be rotated 180 degrees around the angled axis of insertion.

14. The assembly of claim 10, further comprising at least one locking element for preventing rotation of a leg assembly around the angled axis of insertion.

15. The assembly of claim 10, wherein the support surface is circular or rectangular in shape.

16. A self-adjusting support assembly for use on uneven surfaces, comprising:
(a) a support element, wherein the support element is configured as an I-beam;
(b) at least one pivoting leg assembly positioned beneath the support element, wherein the at least one pivoting leg assembly is triangular in shape; and
(c) at least one self-adjusting attachment assembly, wherein the at least one self-adjusting attachment assembly connects the support element to the at least one pivoting leg assembly, and wherein the at least one self-adjusting attachment assembly further includes:
(i) at least one bracket, wherein the at least one bracket is adapted to hingeably attach to the support element, and wherein the at least one bracket further includes:
a) a receiving channel formed therein, wherein the receiving channel is positioned along an angled axis of insertion, and
b) a locking ridge positioned in the receiving channel; and
(ii) a proximal head portion, wherein the proximal head portion is adapted to rotationally cooperate with at least one bracket and to receive the at least one pivoting leg assembly, and wherein the proximal head portion further includes:
a) a flange formed at one end thereof, wherein the flange rotationally engages the locking ridge;
b) a stem positioned beneath the flange, wherein the stem rotationally engages the receiving channel; and
c) a receiving portion positioned beneath the stem, wherein the receiving portion is adapted to receive the at least one leg assembly; and
(d) a support surface attached to the support element, wherein the support surface is perpendicular to the support element.

17. The assembly of claim 16, wherein the at least one pivoting leg assembly further includes multiple tubular leg sections, and wherein the multiple tubular leg sections are connected to one another in a planar configuration.

18. The assembly of claim 16, wherein the at least one pivoting leg assembly can be rotated 180 degrees around the angled axis of insertion.

19. The assembly of claim 16, further comprising at least one locking element for preventing rotation of a leg assembly around the angled axis of insertion.

20. The assembly of claim 16, wherein the support surface is circular or rectangular in shape.

* * * * *